United States Patent
Baran

(10) Patent No.: US 11,175,491 B2
(45) Date of Patent: Nov. 16, 2021

(54) NON-RESONANT MICROELECTROMECHANICAL SYSTEMS SCANNER WITH PIEZOELECTRIC ACTUATORS

(71) Applicant: Microsoft Technology Licensing, LLC, Redmond, WA (US)

(72) Inventor: Utku Baran, Seattle, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 222 days.

(21) Appl. No.: 16/394,709

(22) Filed: Apr. 25, 2019

(65) Prior Publication Data

US 2020/0341265 A1    Oct. 29, 2020

(51) Int. Cl.
| | |
|---|---|
| *G02B 26/08* | (2006.01) |
| *G01L 1/16* | (2006.01) |
| *G01L 1/18* | (2006.01) |
| *G02B 26/10* | (2006.01) |
| *H02N 2/02* | (2006.01) |

(52) U.S. Cl.
CPC .......... *G02B 26/0858* (2013.01); *G01L 1/16* (2013.01); *G01L 1/18* (2013.01); *G02B 26/105* (2013.01); *H02N 2/028* (2013.01)

(58) Field of Classification Search
None
See application file for complete search history.

(56) References Cited

U.S. PATENT DOCUMENTS

| | | | |
|---|---|---|---|
| 2007/0146858 A1* | 6/2007 | Matsuda | G02B 26/105 359/224.1 |
| 2009/0185253 A1 | 7/2009 | Tani et al. | |
| 2012/0162739 A1* | 6/2012 | Yamada | G02B 26/101 359/212.1 |
| 2013/0229698 A1* | 9/2013 | Honda | G02B 26/105 359/199.3 |

(Continued)

FOREIGN PATENT DOCUMENTS

WO    2012176492 A1    12/2012

OTHER PUBLICATIONS

"International Search Report and Written Opinion Issued in PCT Application No. PCT/US2020/025857", dated Jul. 13, 2020, 13 Pages.

*Primary Examiner* — Jennifer D. Carruth
(74) *Attorney, Agent, or Firm* — Ray Quinney & Nebeker P.C; James Bullough

(57) ABSTRACT

The present disclosure relates to a microelectromechanical systems (MEMS) scanner that implements piezoelectric actuation principles to facilitate rotational displacement of a mirror device. The present disclosure includes a MEMS scanning device having a mirror device, a torsional beam structure, and piezoelectric actuators having a shape that facilitates torsional force to be applied to the torsional beam structure and cause the mirror device to rotate about a longitudinal axis. The MEMS scanning device may further include a lever device including multiple stages to both transfer torsional force from the actuators and prevent different actuators from countering torsional forces of other actuators. Moreover, the MEMS scanning device may further include sensor elements to measure torsional forces and control movement of the mirror device.

20 Claims, 9 Drawing Sheets

(56) References Cited

U.S. PATENT DOCUMENTS

2014/0340726 A1   11/2014  Gu-stoppel et al.
2018/0290881 A1*  10/2018  Yamada ................ B81B 7/0006
2019/0265462 A1*   8/2019  Yamada ................ G02B 26/101
2020/0209617 A1*   7/2020  Kimura ................ G02B 26/101

* cited by examiner

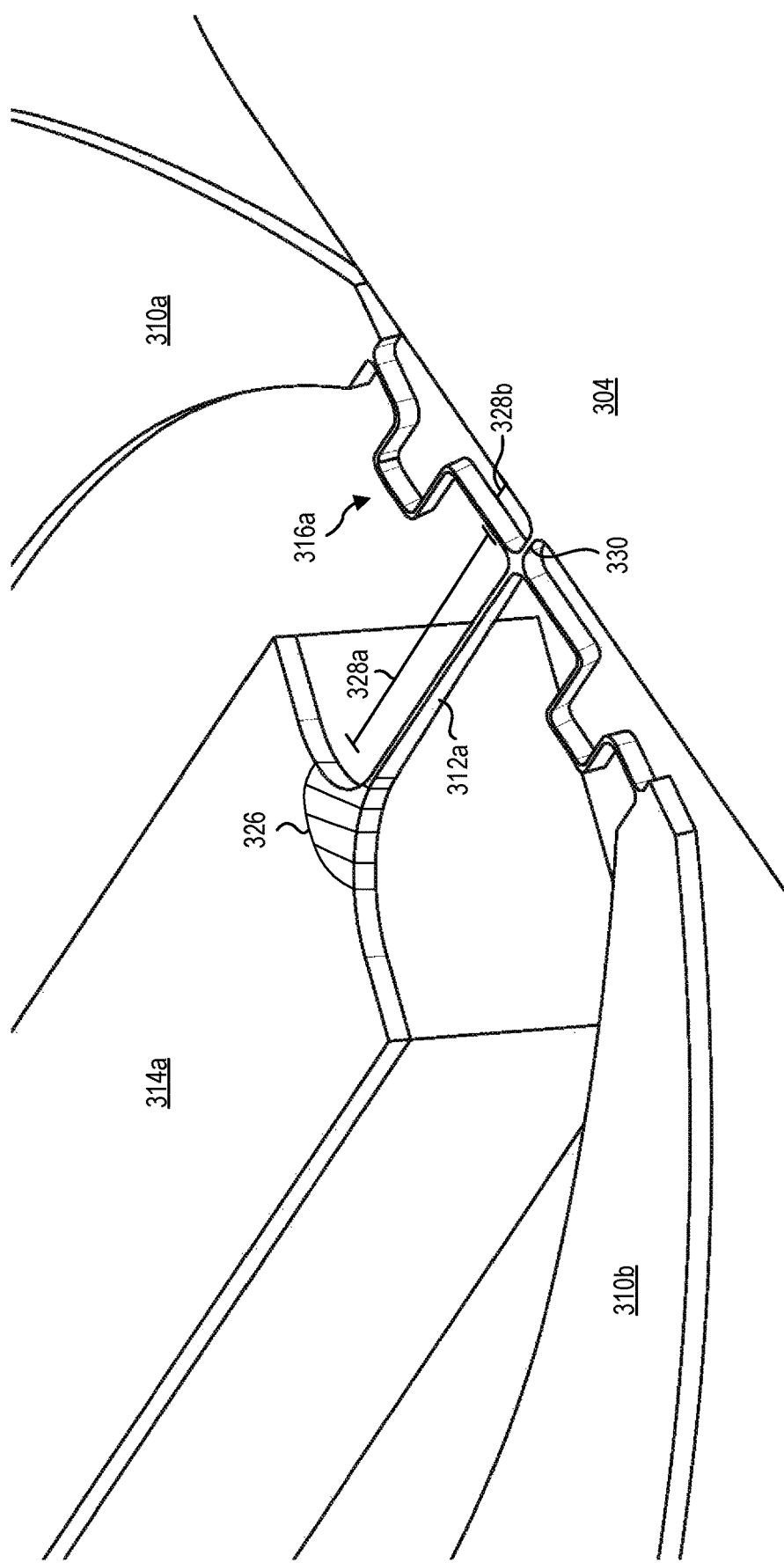

NON-RESONANT MICROELECTROMECHANICAL SYSTEMS SCANNER WITH PIEZOELECTRIC ACTUATORS

CROSS-REFERENCE TO RELATED APPLICATIONS

N/A

BACKGROUND OF THE DISCLOSURE

Microelectromechanical systems (MEMS) scanners are becoming increasingly common in a variety of scanning applications. Indeed, MEMS devices are used in an increasing number of scanning devices (e.g., laser scanners) and applications to enhance display applications and improve performance specifications of a variety of scanning devices including high-frequency scanners, low-frequency scanners, linear and non-linear scanners, and two-dimensional scanners. Many MEMS scanners include actuator devices that rely on various actuation principles (e.g., electrostatic actuation, electromagnetic actuation, piezoelectric actuation) to actuate movement of one or more mirrors at different frequencies and at varying levels of precision.

SUMMARY

One or more embodiments described herein relate to a non-resonant MEMS scanner that implements piezoelectric actuation principles to facilitate rotational displacement of a mirror device. For example, one or more embodiments described herein include a non-resonant MEMS scanning device including a mirror device and a torsional beam structure. The torsional beam structure may include a first torsional beam extending outward from a first longitudinal side of the mirror device and a second torsional beam extending outward from a second longitudinal side of the mirror device. A torsional force applied to the torsional beam structure may cause the mirror device to rotate about a longitudinal axis.

The MEMS scanning device may further include a pair of actuator wings positioned on opposite sites of the mirror device and coupled to the torsional beam structure. Each of the actuator wings from the pair of actuator wings may include a first actuator positioned on a first side of the torsional beam structure and coupled to the torsional beam structure via a lever device. The first actuator may have a shape that, when the first actuator is activated, causes a torsional force to be applied to the first actuator about the longitudinal axis that transfers to the torsional beam structure via the lever device. The actuator wing may further include a second actuator positioned on a second side of the torsional beam structure and coupled to the torsional beam structure via the lever device. The second actuator may have a similar shape as the first actuator.

In one or more embodiments, the actuators are activated using piezoelectric principles. For example, the first actuator may be a first piezoelectric actuator and the second actuator may be a second piezoelectric actuator. Each piezoelectric actuator may include a silicon substrate having a thin film piezoelectric material deposited thereon.

The actuators may have a variety of shapes in accordance with one or more embodiments. For example, the shape of the first and second actuators may include one or more of a circular shape, parabolic shape, arcuate shape, curved shape, or a polygonal shape that, when the actuator(s) are activated, causes a torsional force to be applied to the actuator(s) about the longitudinal axis.

In one or more embodiments, each of the actuator wings include an anchor structure positioned between first and second actuators and coupled to the mirror device via the torsional beam structure. In one or more embodiments, the MEMS scanning device includes a sensing element on at least one anchor structure of the pair of actuator wings configured to detect a measure of rotation of the mirror device based on torsional force applied to the torsional beam structure. The sensing element may include a piezoelectric material configured to detect the measure of rotation based on a detected electric potential generated from the torsional force applied to the torsional beam structure. The sensing element may include a piezoresistive material configured to detect the measure of rotation based on a detected change in electrical resistivity from the torsional force applied to the torsional beam structure.

The lever device may include a first portion of the lever device for coupling the first actuator to the torsional beam. The lever device may further include a second portion of the lever device for coupling the second actuator to the torsional beam where the second portion of the lever device has a symmetrical shape to the first portion of the lever device about the longitudinal axis. Each portion of the lever device may include multiple stages. For example, each portion of the lever device may include a stiff stage that provides structural support for translating the torsional force from a corresponding actuator to the torsional beam structure. Each portion may additionally include a compliance stage that flexes in response to torsional force applied to the torsional beam structure from the first actuator or the second actuator.

In one or more embodiments, the mirror device is configured to rotate about the longitudinal axis by rotating back and forth between maximum rotational displacement angles. The maximum rotational displacement angles may exceed a rotational displacement of the first actuator when activated. Moreover, each actuator wing of the pair of actuator wings may be configured to be activated by applying an alternating voltage signal to the first actuator and the second actuator.

In addition to the MEMS scanning device, one or more embodiments described herein relate to unique features and functionality of an actuator wing of a non-resonant MEMS device. The actuator wing may include a torsional beam extending outward from a side of a mirror device where torsional force applied to the torsional beam causes the mirror device to rotate about a longitudinal axis. The actuator wing may include a first actuator positioned on a first side of the torsional beam and coupled to the torsional beam via a first portion of a two-stage lever device where the first portion of the two-stage lever device includes a stiff stage and a compliance stage. The stiff stage may provide structural support for translating the torsional force from the first actuator to the torsional beam structure. The compliance stage may flex in response to torsional force applied to the torsional beam from the first actuator or the second actuator.

The actuator wing may also include a second actuator positioned on a second side of the torsional beam structure and coupled to the torsional beam structure via a second portion of the two stage lever device. The second portion of the two-stage lever device may have a symmetrical shape as the first portion of the two-stage lever device about the torsional axis. As an example, the first portion of the lever device may include a zig-zag structure of support members positioned between the first actuator and the torsional beam while the second portion of the lever device includes a symmetrical zig-zag structure of support members positioned between the second actuator and the torsional beam.

As another example, one or more embodiments of an actuator wing may include a torsional beam extending outward from a side of a mirror device where torsional force applied to the torsional beam causes the mirror device to rotate about a longitudinal axis. The actuator wing may further include first actuator positioned on a first side of the torsional beam and coupled to the torsional beam via a lever device where the first actuator has a shape that, when activated, applies a torsional force about the longitudinal axis that transfers to the torsional beam. The actuator wing may further include a second actuator positioned on a second side of the torsional beam opposite the first side and coupled to the torsional beam via the lever device where the second actuator has a similar shape as the first actuator. The shape of the first and second actuators may include one or more of a circular shape, parabolic shape, arcuate shape, curved shape, or a polygonal shape.

In one or more embodiments, the actuator wing includes an anchor structure positioned between the first actuator and the second actuator and coupled to the mirror device via the torsional beam structure. The anchor structure may include a sensor element configured to detect a measure of rotation of the mirror device based on torsional force applied to the torsional beam. In one or more embodiments, the actuators refer to piezoelectric actuators. Moreover, in one or more implementations, the sensing element includes a piezoelectric material or a piezoresistive material configured to detect the torsional force applied to the torsional beam.

BRIEF DESCRIPTION OF THE DRAWINGS

In order to describe the manner in which the above-recited and other features of the disclosure can be obtained, a more particular description will be rendered by reference to example implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 3C illustrates a perspective view of a torsional sensing element in accordance with one or more embodiments.

DETAILED DESCRIPTION

Figure 1:
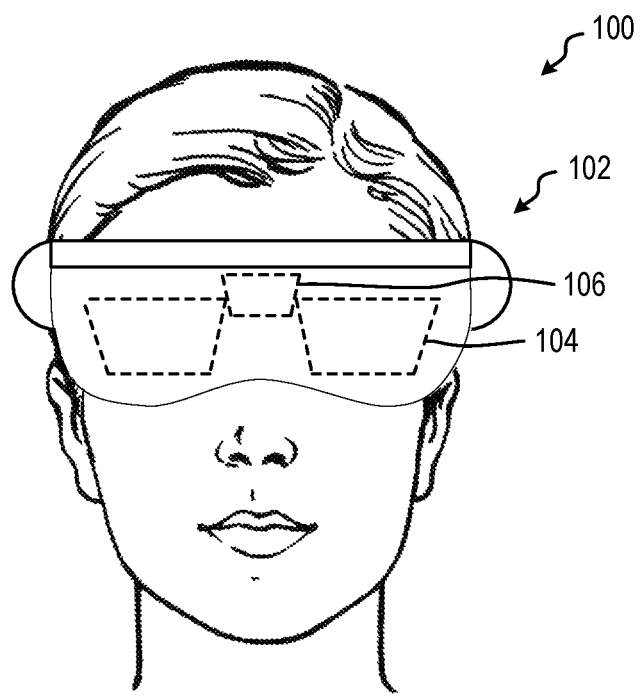
FIG. 1 is a perspective view of a head-mounted display (HMD) including an example display system according to one or more embodiments.

The present disclosure relates to a microelectromechanical systems (MEMS) scanner. In particular, the present disclosure relates to a MEMS scanning device that causes rotational displacement of a mirror device about an axis (e.g., a longitudinal axis) using one or more piezoelectric actuators. As will be discussed in further detail below, the MEMS scanning device includes a mirror device or other structure including a reflective surface configured to rotate about a longitudinal axis. The MEMS scanning device may further include a torsional beam structure oriented along the longitudinal axis and including torsional beams positioned on opposite sides of the mirror device. In one or more embodiments, the mirror device rotates around the longitudinal axis based on a torsional force applied to the torsional beam structure.

As will be discussed in further detail below, the torsional force is applied to the torsional beams using piezoelectric actuation principles. In particular, the MEMS scanning device may include actuator wing structures positioned on opposite sides of the mirror device that, when actuated by applying an electrical signal to piezoelectric material, causes actuators to exert a torsional force about the longitudinal axis that is applied to the torsional beams. As will be discussed below, the actuator wings may have a particular shape and orientation that causes the actuators to move rotationally about the torsional beams rather than simply moving horizontally or vertically relative to the mirror device. This path of motion facilitates a more controlled and predictable force to be applied to the torsional beam, thus facilitating a controlled displacement of the mirror device in one or more embodiments described herein.

In addition to actuators shapes that facilitate a torsional force being applied to the torsional beams, the MEMS scanning device may further include a lever device that transfers the torsional force applied by the actuators to the torsional beam. In particular, as will be discussed by way of example in the figures below, the MEMS scanning device may include two-stage levers for coupling the actuators to the torsional beams. For instance, a two-stage lever may include a first stiff stage that provides structural support for translating force from the actuator to a torsional beam. The two-stage lever may further include a second compliance stage configured to flex in response to torsional force to prevent pairs of actuators from negating or otherwise counteracting torsional force applied to the torsional beams.

Moreover, the MEMS scanning device may include a sensing element positioned on the MEMS scanning device that facilitates accurately detecting a force applied to the mirror device. In particular, as will be discussed in further detail below, the MEMS scanning device may include piezoelectric and/or piezoresistive material that accurately detects torsional forces applied to torsional beams thereby enabling a controller or other computing device to receive real-time data associated with rotation of the mirror device and better control both a rotation and frequency of the mirror device.

Additional detail will now be provided regarding a MEMS scanning device in relation to illustrative figures portraying example implementations. For example. FIG. 1 illustrates an example environment 100 including a head mounted display (HED) 102 (or simply "HED 102") worn by an individual. The HED 102 may implement one or more MEMS scanning devices in accordance with examples disclosed herein. The HED 102 may include a display system configured to display near-eye imagery to an individual. As shown in FIG. 1, in one or more embodiments, the HMD 102 includes a display device 104 that presents a display to a user in accordance with an application of the HMD 102. For example, in one or more embodiments, the display device 104 may be substantially opaque and present virtual imagery as part of a virtual-reality (VR) experience in which the wearer of the HMD 102 is immersed in the VR experience. Alternatively, the display device 104 may be partially transparent, allowing the user to view presented virtual imagery in combination with a real-world background to form an augmented reality (AR) or mixed-reality experience. The opacity and experience may adjust to facilitate different display applications using the same HMD 102.

As further shown in FIG. 1, the HMD 102 may include a computing device 106 to perform various computing functions, including generating virtual imagery or other visual content to be presented via the display device 104. The computing device 104 may implement a variety of hardware, software, firmware, or any combination thereon. Indeed, the computing device may implement an integrated logic device, such as a processor or storage subsystem. The computing device 104 may further include a non-transitory computer-readable storage medium including instructions thereon that implements various features and functionality described herein. The instructions may be organized into routines, programs, objects, components, data structures etc.

The HMD 102 may include various sensors to provide information to the computing device 106. Such sensors may include one or more inward facing image sensors (e.g. for eye tracking), one or more outward facing image sensors, an inertial measurement unit (IMU), and one or more microphones (e.g. for receiving voice commands). In one or more embodiments, the HMD 102 includes various sensors that provide information to the computing device 106

Figure 2:
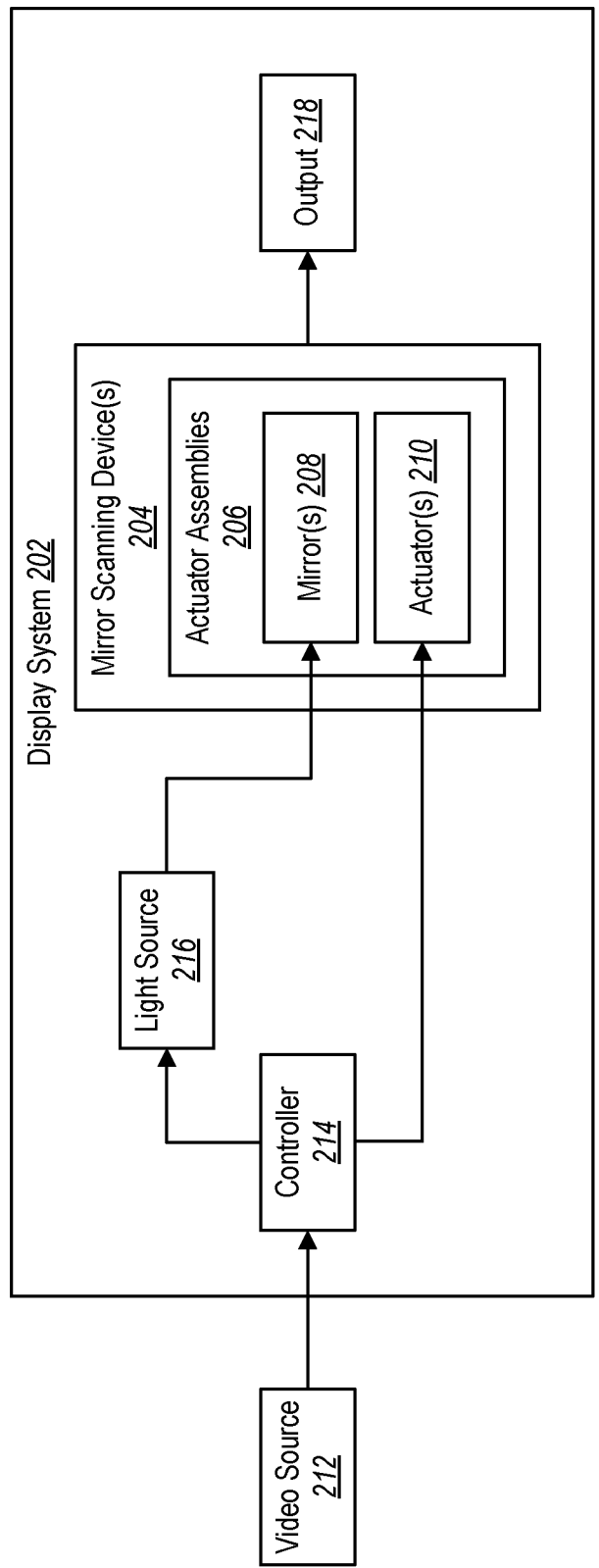
FIG. 2 shows a block diagram of an example display system including a MEMS scanning system in accordance with one or more embodiments.

FIG. 2 illustrates an example display system 202 including one or more mirror scanning device(s) 204. The mirror scanning device(s) 204 may implement aspects of the display system 202 in accordance with one or more embodiments described herein. As shown in FIG. 2, the mirror scanning device(s) 204 may include one or more actuator assemblies 206. The actuator assemblies 206 may include one or more mirror(s) 208 and one or more actuator(s) 210. The actuators 210 may include a combination of resonant and non-resonant actuators. For example, in one or more embodiments, the display system 202 makes use of a combination of different types of MEMS scanning devices such as a combination of resonant MEMS devices (e.g., to perform horizontal scanning for a display) and non-resonant MEMS devices (e.g., to perform vertical scanning for a display).

As shown in FIG. 2, the display system 202 receives video content from a video source 212 at a controller 214 operatively coupled to the mirror scanning device(s) 204. In one or more embodiments, the video source 212 may be an example of the computing device 106 in FIG. 1 and provide digital video content to be presented to a user of the HMD 102. The controller 214 may provide instructions (e.g., in accordance with data received from the video source 212) causing a light source 216 to emit light. The light source 216 may include any suitable light-emitting elements, such as one or more lasers that output light in any suitable wavelength range (e.g., red, green, blue wavelengths for the production of color images). The light source 216 may alternatively emit monochromatic light.

In one or more embodiments, the mirror(s) 208 of the mirror scanning device(s) 204 are configured to receive and reflect the light emitted from the light source 216 at various angles to scan an image. For example, the mirror(s) 208 may rotate to control an angle at which light from the light source 216 is reflected to thereby scan an image (or respective portion of an image). In one or more embodiments, the mirror(s) 208 may include a single mirror configured to scan light in horizontal and vertical directions. The mirror(s) 208 may also include separate mirrors for scanning in respective horizontal and vertical directions.

In one or more embodiments, the mirrors 208 are rotated or otherwise displaced using one or more actuator(s) 210. For example, the mirror scanning device 204 may include a combination of different types of actuator(s) 210 (e.g., electrostatic, electromagnetic, piezoelectric). Moreover, the actuator(s) 210 may include a combination of resonant and non-resonant devices. In one or more embodiments described herein, the actuators 210 refer to non-resonant actuators that utilize piezoelectric principles to actuate movement of a corresponding mirror 208. Indeed, it will be understood that a mirror scanning device 204 may include a combination of different actuator assemblies 206 having different types of actuators 210 and corresponding mirrors 208. As an example, a mirror scanning device 204 may include one or more resonant actuators and corresponding mirror devices for scanning light in a first direction (e.g., a horizontal direction) in combination with one or more non-resonant actuators and corresponding mirror devices in accordance with one or more embodiments described herein.

As shown in FIG. 2, the light reflected using components of the mirror scanning device 204 may be directed toward an output 218 for display of a scanned image. The output 218 may include projection optics, waveguide optics, or other suitable form.

Figure 3A:
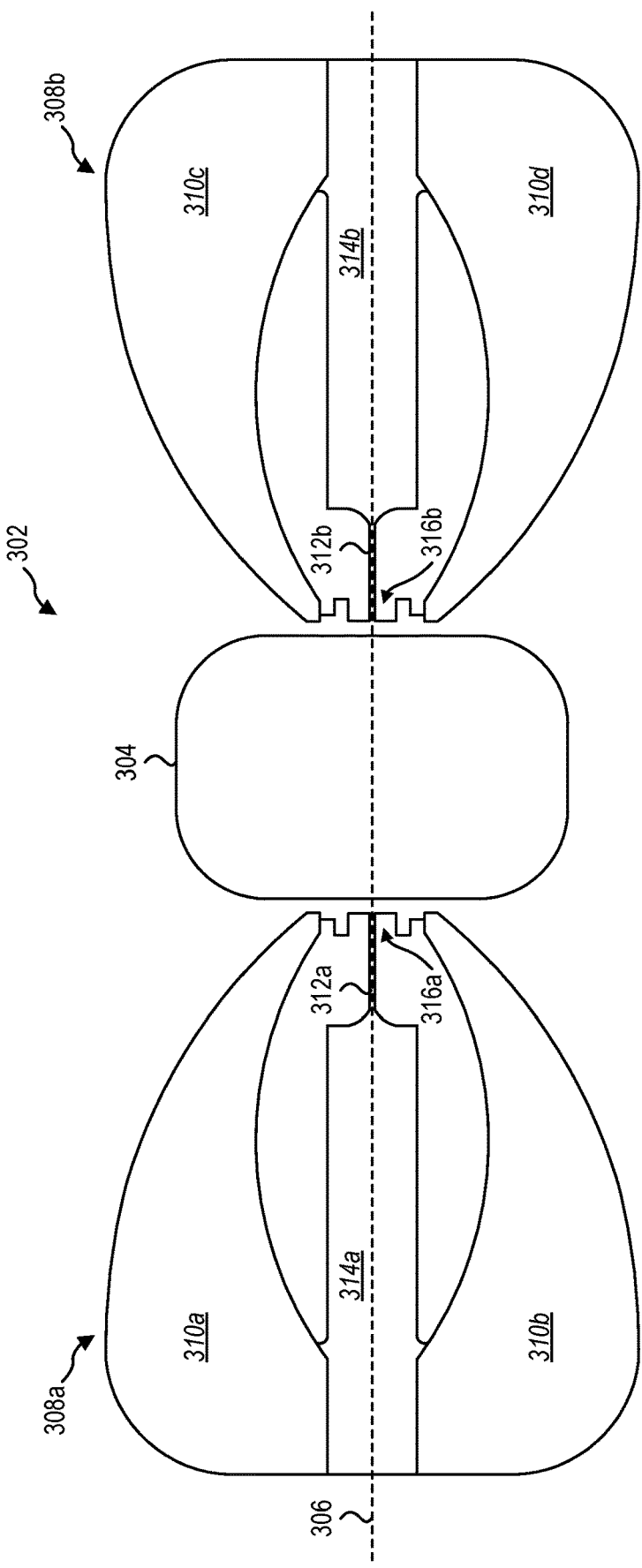
FIG. 3A illustrates a top view of an example actuator assembly that may be implemented in a MEMS scanning system in accordance with one or more embodiments.

FIG. 3A illustrates a top view of an actuator assembly 302 in accordance with one or more embodiments described herein. In particular, the actuator assembly 302 may refer to an example actuator assembly 206 implemented within a scanning device 204 as discussed above in connection with FIG. 2. The actuator assembly 302 may include a mirror device 304 configured to rotate between rotational displacement angles about a longitudinal axis 306. The mirror device 304 may refer to any reflective material configured to rotate about a longitudinal axis 306. The mirror device 304 may have a variety of shapes including, by way of example, a square shape, circular shape, elliptical shape, or any shape capable of rotating about the longitudinal axis 306.

The actuator assembly 302 may further include a pair of actuator wings 308a-b positioned on opposite sides of the mirror device 304. For example, the actuator assembly 302 may include a first actuator wing 308a on a first side of the mirror device 304 and a second actuator wing 308b on a second (opposite) side of the mirror device 304. As shown in FIG. 3A, when actuators of the actuator assembly 302 are not activated or displaced, the actuator wings 308a-b and the mirror device 304 may be oriented on the same reference plane.

As shown in FIG. 3A, the actuator wings 308a-b may include respective pairs of actuators 310a-d. In particular, the first actuator wing 308a may include a first actuator 310a and a second actuator 310b positioned on a first side of the mirror device 304. The second actuator wing 308b may include a third actuator 310c and a fourth actuator 310d positioned on a second side of the mirror device 304. In one or more embodiments described herein, the actuators 310a-d refer specifically to piezoelectric actuators. For instance, in one or more embodiments, the actuators 310a-d are made from a substrate material (e.g., a silicon substrate) and coated with a thin film piezoelectric material that provides piezoelectric properties to the actuators 310a-d. Accordingly, in response to an electrical voltage or current being applied to the actuators 310a-d, the actuators 310a-d may flex or otherwise displace in a torsional direction about the longitudinal axis 306, as will be discussed in further detail below.

The actuator wings 308a-b may additionally include a torsional beam structure having a first torsional beam 312a and a second torsional beam 312b. In particular, the first actuator wing 308a may include a first torsional beam 312a extending outward from the first side of the mirror device 304 along the longitudinal axis 306. The second actuator wing 308b may include a second torsional beam 312b extending outward from the second side of the mirror device 304 also along the longitudinal axis 306. The torsional beam structure may include a unitary structure (e.g., including a structure that connects the first torsional beam 312a and the second torsional beam 312b) or may include two distinct components (e.g., the first torsional beam 312a and second torsional beam 312b) that extend from opposite sides of the mirror device 304, respectively.

As shown in FIG. 3A, the actuators 310a-d may include actuator pairs positioned symmetrically about the torsional beam structure and the longitudinal axis 306. For example, the first actuator 310a may have a mirrored or symmetric shape to the second actuator 310b across the longitudinal axis 306 corresponding to the first torsional beam 312a. Similarly, the third actuator 310c may have a mirrored or otherwise symmetrical shape to the fourth actuator 310d across the longitudinal axis 306 corresponding to the second torsional beam 312b.

Moreover, while the actuators 310a-d may have a curved shape as shown in FIG. 3A, the actuators 310a-d may have a variety of different shapes in accordance with different embodiments of the actuator assembly 302. By way of example, the actuators 310a-d may have a circular shape, parabolic shape, arcuate shape, curved shape, or polygonal shape in accordance with one or more embodiments. In one or more embodiments, the actuators 310a-d have a shape such that a center of mass of each respective actuator is positioned relative to the longitudinal axis 306 (e.g., in a transverse direction from the longitudinal axis 306). In this way, when one or more of the actuators 310a-d are activated, a torsional force may be applied to the torsional beam structure and actuate an efficient transfer of torsional force to the torsional beam structure, thereby causing the mirror device 304 to rotate about the longitudinal axis in a controllable way.

Each of the actuator wings 308a-b may include anchor structures. For example, as shown in FIG. 3A, the first actuator wing 308a includes a first anchor structure 314a coupled to the mirror device 304 via the first torsional beam 312a and extending outward from the mirror device 304 along the longitudinal axis 306. Similarly, the second actuator wing 308b may include a second anchor structure 314b coupled to the mirror device 304 via the second torsional beam 312b and extending outward from the mirror device 304 along the longitudinal axis 306.

Each of the anchor structures 314a-b may provide a fixed point or anchor point around which the torsional beams 312a-b may flex. For example, while not shown in FIG. 3A, the anchor structures 314a-b may be fixed or otherwise connected to an underlying base structure, such as a circuit board, printed circuit board (PCB), or underlying substrate that remains in a fixed position relative to moving parts of the actuator assembly 302. The underlying base structure may include circuitry configured to drive the actuator assembly 302 (e.g., a voltage and/or current source coupled to the actuators 310a-d). As will be discussed in further detail below in connection with FIGS. 4A-4C, the mirror device 304 and movable components of the actuator wings 308a-b may be configured to move or displace relative to the anchor structures 314a-b.

As further shown in FIG. 3A, the actuator assembly 302 includes lever devices 316a-b that couple the actuators 310a-d to the torsional beam structure. For example, the first actuator wing 308a includes a first lever device 316a that couples the first and second actuators 310a-b to the first torsional beam 312a. Similarly, the second actuator wing 308b may include a second lever 316b that couples the second and third actuators 310c-d to the second torsional beam 312b. As shown in FIG. 3A, the lever devices 316a-b may have a zig-zig structure of support members positioned between respective actuators 310a-d and associated torsional beams 312a-b.

The components of the actuator assembly 302 may include a variety of materials having different properties. In one or more embodiments, each of the components include a silicon substrate. In addition, one or more of the components may include different surface materials having different properties. For instance, the mirror device 304 may include a silicon substrate having a reflective surface material for reflecting a laser or other emitted light source. As another example, the actuators 310a-d may include a silicon substrate having a piezoelectric thin film deposited thereon that gives the actuators 310a-d piezoelectric properties in accordance with one or more embodiments described herein.

Figure 3B:
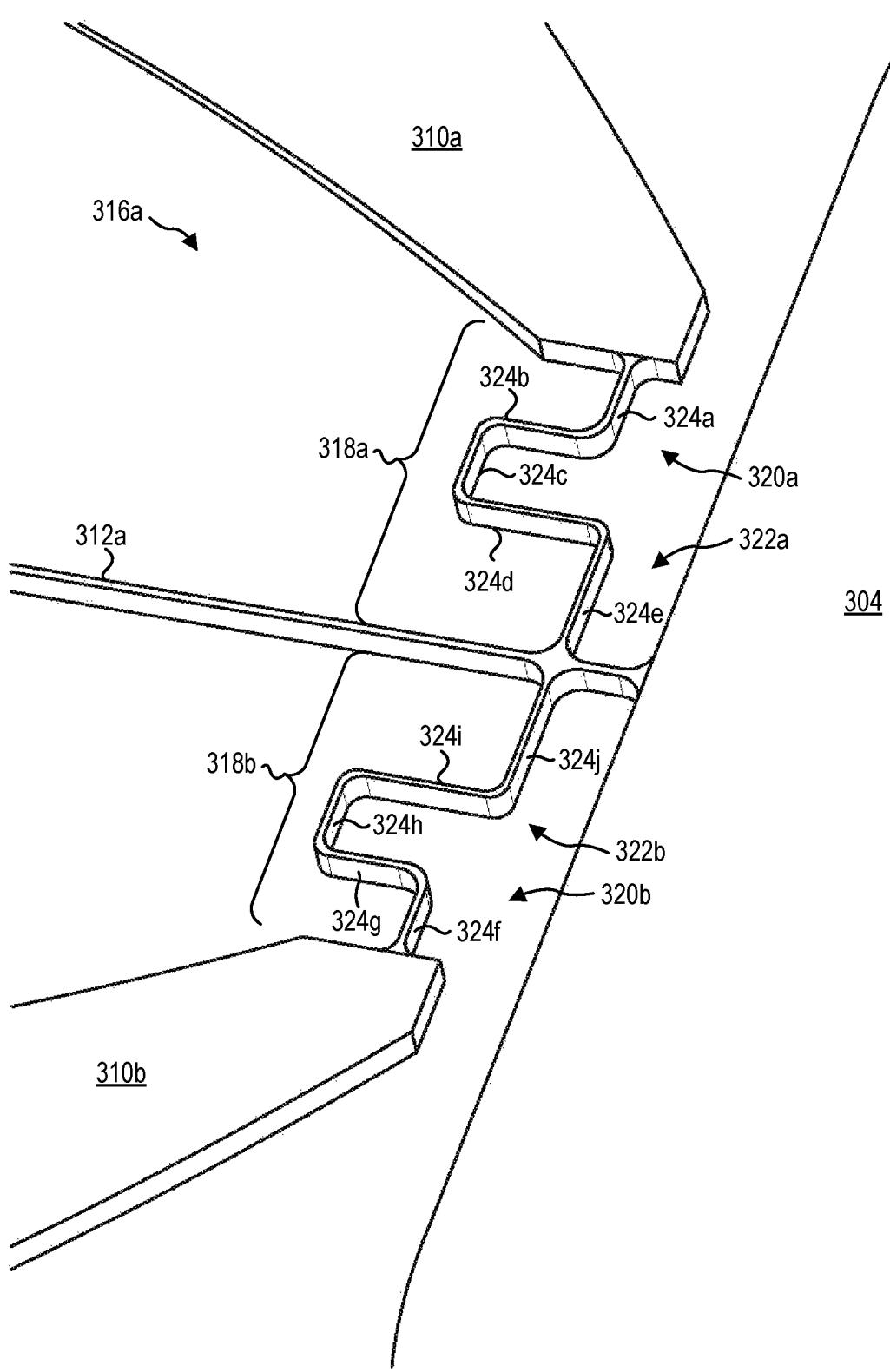
FIG. 3B illustrates a perspective view of a two-stage lever device for converting torsional force from an actuator to a torsional beam in accordance with one or more embodiments.

Proceeding onto FIG. 3B, this figure illustrates a close-up view showing further detail in connection with the first lever device 316a of the first actuator wing 308a. It will be understood that features and functionality described in connection with the first lever device 316a may similarly apply to the second lever device 316b positioned on the opposite side of the mirror device 304 on the actuator assembly 302.

As shown in FIG. 3B, the lever device 316a includes a first portion 318a associated with the first actuator 310a and a second portion 318b associated with the second actuator 310b. In particular, the first actuator 310a is coupled to the torsional beam 312a via a first portion 318a of the lever device 316a while the second actuator 310b is coupled to the torsional beam 312a via a second portion 318b of the lever device 316a.

Each of the respective portions 318a-b of the lever device 316a may include multiple stages associated with beam members that define the structure of the lever device 316a. For example, the first portion 318a of the lever device 316a may include a first stage 320a. In one or more embodiments, the first stage 320a includes a first member 324a extending from the first actuator 310a toward the torsional beam structure 312a orthogonal to the longitudinal axis 306 and a second member 324b coupled to the first member 324a and extending parallel to the longitudinal axis 306. The second member 324b is shown extending away from the mirror device 304. The second member 324b may alternatively extend toward the mirror device 304 in other embodiments. The first portion 318a of the lever device 316a may further include a third member 324c that couples the second member 324b to structural members of a second stage 322a of the first portion 318a of the lever device 316a.

As shown in FIG. 3B, the second stage 322a may include a fourth member 324d oriented parallel to the longitudinal axis 306 and coupled to a fifth member 324e oriented orthogonal to the longitudinal axis 306 and coupling to the torsional beam 312a. In particular, in the example shown in FIG. 3B, the fourth member 324d is coupled to the third member 324c and extends toward the mirror device 304. The fourth member 324d may alternatively extend away from the mirror device 304. In the illustrated example, the fifth member 324e is further coupled to the fourth member 324d and extends toward the torsional beam 324e.

Indeed, as shown in FIG. 3B, the structural members 324a-e of the first portion 318a of the lever device 316a may form a zig-zag structure of support members 3241-e positioned between the first actuator 310a and the torsional beam 312b. For example, each of the members 324a-e may couple to each other at ninety-degree angles and be oriented on a common plane either parallel or orthogonal to the longitudinal axis 306. Nevertheless, other arrangements and orientations of the members 324a-e may be used for providing multiple stages of a lever device that accomplishes similar features and functionality as the example shown in FIG. 3B.

As mentioned above, the first portion 318a of the lever device 316a may have a first stage 320a including the first member 324a and the second member 324b. The first stage 320a may refer to a stiff stage having a design (e.g., based on the orientation, length, and flexible properties of the members 324a-b) that provides structural support for translating torsional force applied to the first actuator 310a to the beam structure 312a. For example, the first stage 320a may include members 324a-b designed to remain stiff relative to the first actuator 310a to cause torsional force applied as a result of displacement of the first actuator 310a to be transferred in an efficient and controllable way to the torsional beam 310a.

In addition to the first stage 320a, the first portion 318a of the lever device 316a may have a second stage 320b including the fourth member 324d and the fifth member 324e. The second stage 322a may refer to a compliance stage having a design (e.g., based on the orientation, length, and flexible properties of the members 324d-e) that flexes in response to torsional force applied to the torsional beam 312a by the first actuator 310a (or the second actuator 310b). For example, the second stage 322a may include members 324d-e designed to flex in a controlled way to prevent the two actuators 310a-b of the actuator wing 308a from counteracting competing torsional forces applied to the torsional beam 312a. The orientation and length of the members of the second stage 322a may be designed based on a desired frequency of rotation of the mirror device 304, a desired angle or rotation of the mirror device 304, or other considerations.

As shown in FIG. 3B, and as mentioned above, the lever device 316a includes a second portion 318b of the lever device 316a on an opposite side of the torsional beam 312a from the first portion 318a. The second portion 318b of the lever device 316a may similarly include a first stage 320b and a second stage 322b including similar features as the first stage 320a and the second stage 322a of the first portion 318a of the lever device 316a. Moreover, the second portion 318b may include structural members 324f-j having similar features and characteristics as corresponding members 324a-e from the first portion 318a of the lever device 316a. In one or more embodiments, the members 324a-e from the first portion 318a and the members 324f-j from the second portion 318b may form a symmetrical shape about the longitudinal axis, as shown in FIG. 3B.

Proceeding onto FIG. 3C, additional detail is provided in connection with a sensor element of an actuator wing that facilitates precise tracking or otherwise determining frequency and displacement information associated with rotation of the mirror device 304 about the longitudinal axis 306. In particular, FIG. 3C illustrates an example configuration of a sensor element 326 on the first anchor structure 314a of the first actuator wing 308a configured to detect a measure of rotation (e.g., angle of displacement, frequency of mirror rotation) of the mirror device 304 about the longitudinal axis 306. In one or more embodiments, the sensor element 326 detects or otherwise facilitates determining the measure of rotation by detecting torsional force applied to the torsional beam 312a as a result of displacement of the actuators 310a-b. While not shown in FIGS. 3A-3C, the second actuator wing 308b may additionally (or alternatively) include a sensor element having similar features and functionality as the sensor element 326 described in connection with FIG. 3C.

The sensor element 326 may operate in a variety of ways. For example, in one or more embodiments, the sensor element 326 includes a piezoelectric material (e.g., a piezoelectric thin-film) that covers a portion of the anchor structure 314a and/or torsional beam 312a. In this example, the sensor element 326 may generate an electrical charge (e.g., a voltage signal) based on mechanical forces (e.g., torsional forces) applied to the structural beam 312a. As an alternative, the sensor element 326 may include a piezoresistive material capable of causing and detecting a change in electrical resistance as a result of mechanical strain applied to the sensor element 326 due to torsional forces being transferred to the torsional beam 312a in accordance with one or more embodiments.

As further shown in FIG. 3C, the torsional beam 312a may include an intersection point 330 at which the lever device 316a (e.g., respective portions 318a-b of the lever device 316a) intersects the torsional beam 312a. In one or more embodiments, a location of the intersection point 330 is determined based on a desired sensitivity of the sensor element 326. In particular, as shown in FIG. 3C, the location of the intersection point 330 may be selected based on a first distance 328a between the intersection point 330 and the sensor element 326 and a second distance 328b between the intersection point 330 and the mirror device 304. The specific distances 328a-b and/or ratio between the distances 328a-b may determine a sensitivity of the sensor element 326 in obtaining accurate or real-time measurements of a displacement of the mirror device 304 and/or frequency of the mirror device 304 rotation. Accordingly, the first distance 328a and second distance 328b (or ratio between the first distance 328a and the second distance 328b) may be identified and implemented as part of the actuator assembly 302 design based on a desired or required sensitivity of the piezoelectric and/or piezoresistive material of the sensor element 326. Indeed, the distances 328a-b may be identified and implemented in order to obtain accurate and reliable measures of rotation and frequency for the mirror device 304.

Figure 4A:
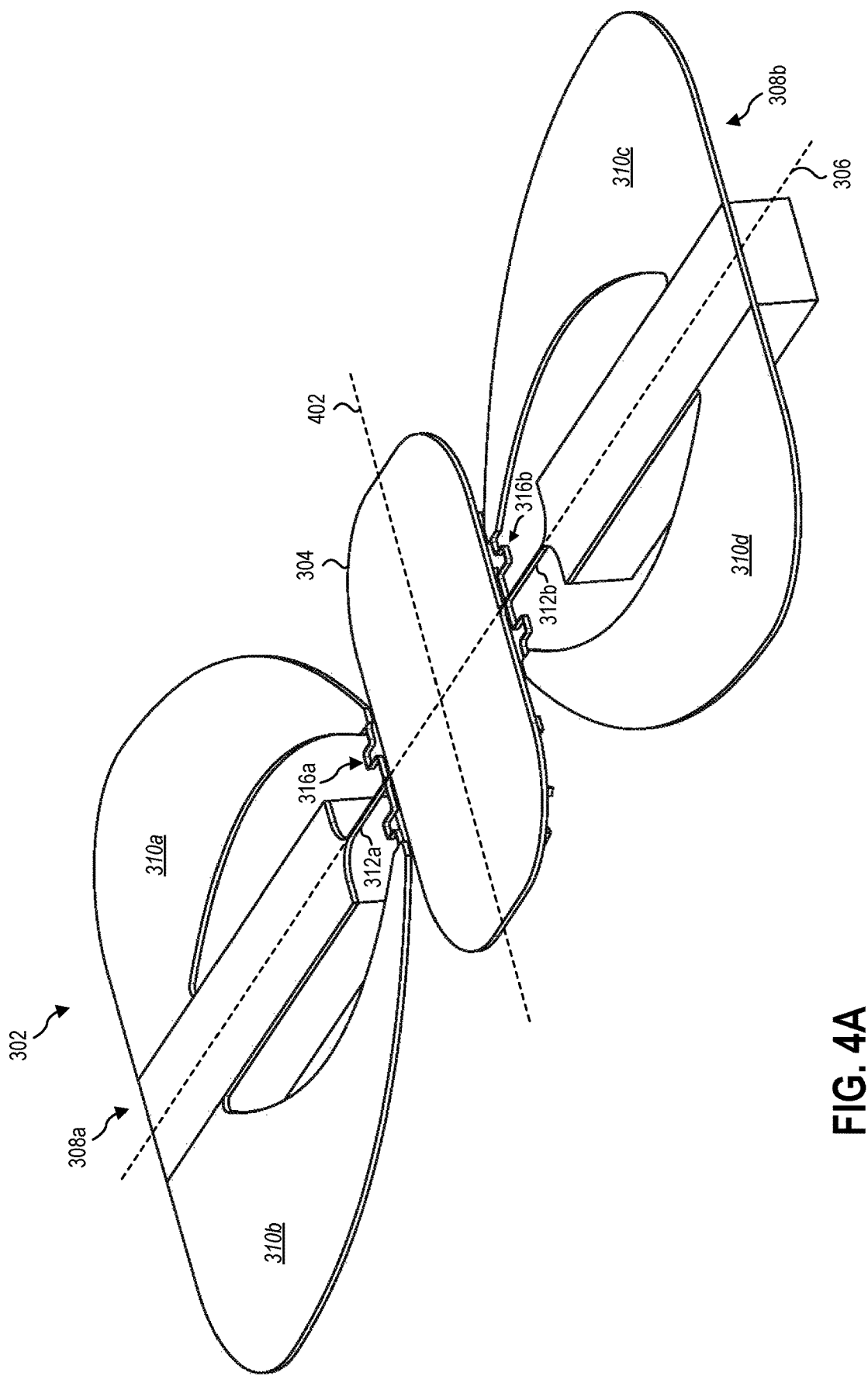
FIGS. 4A-4C illustrate an example implementation of the actuator assembly shown in FIG. 2 in accordance with one or more embodiments.
Figure 4B:
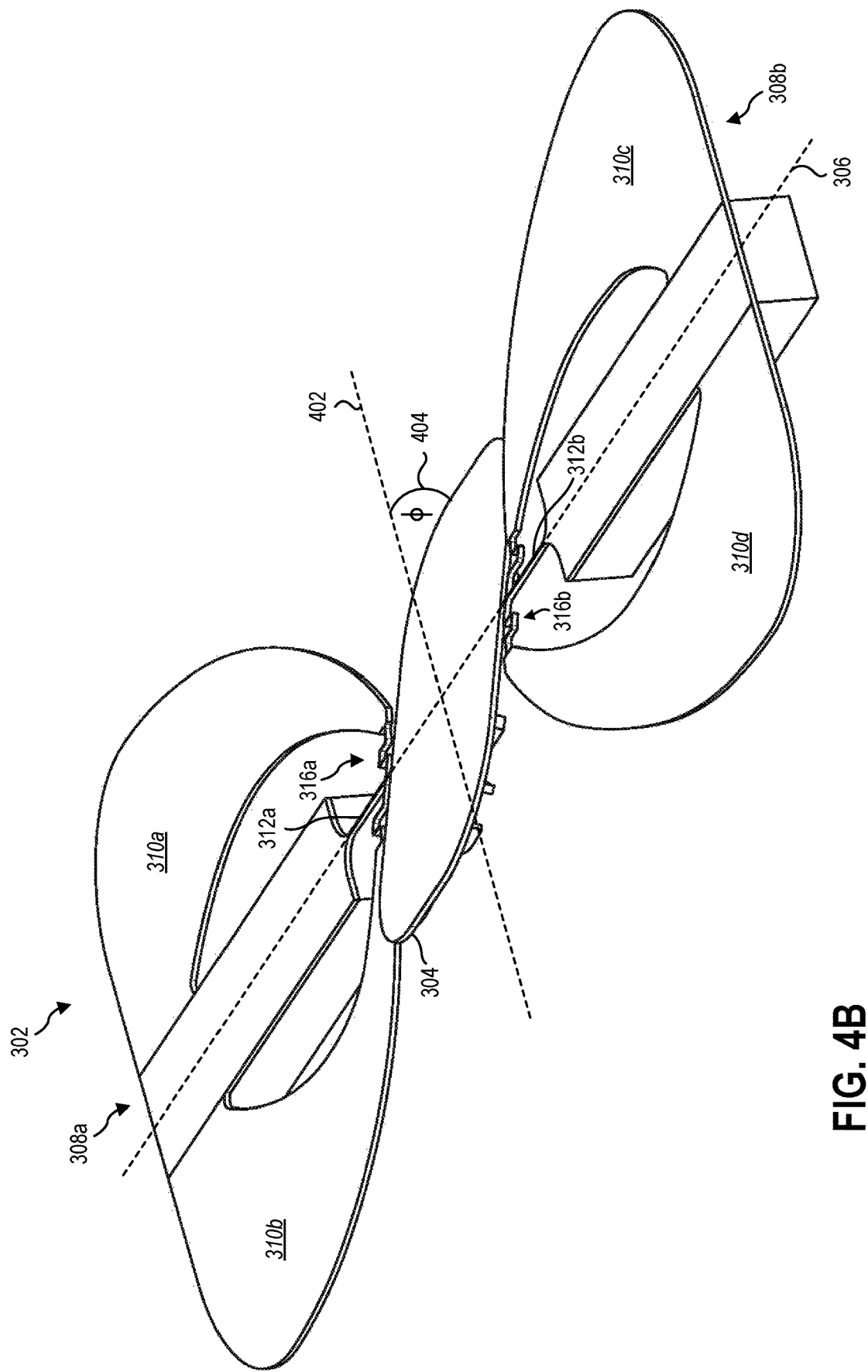
Figure 4C:
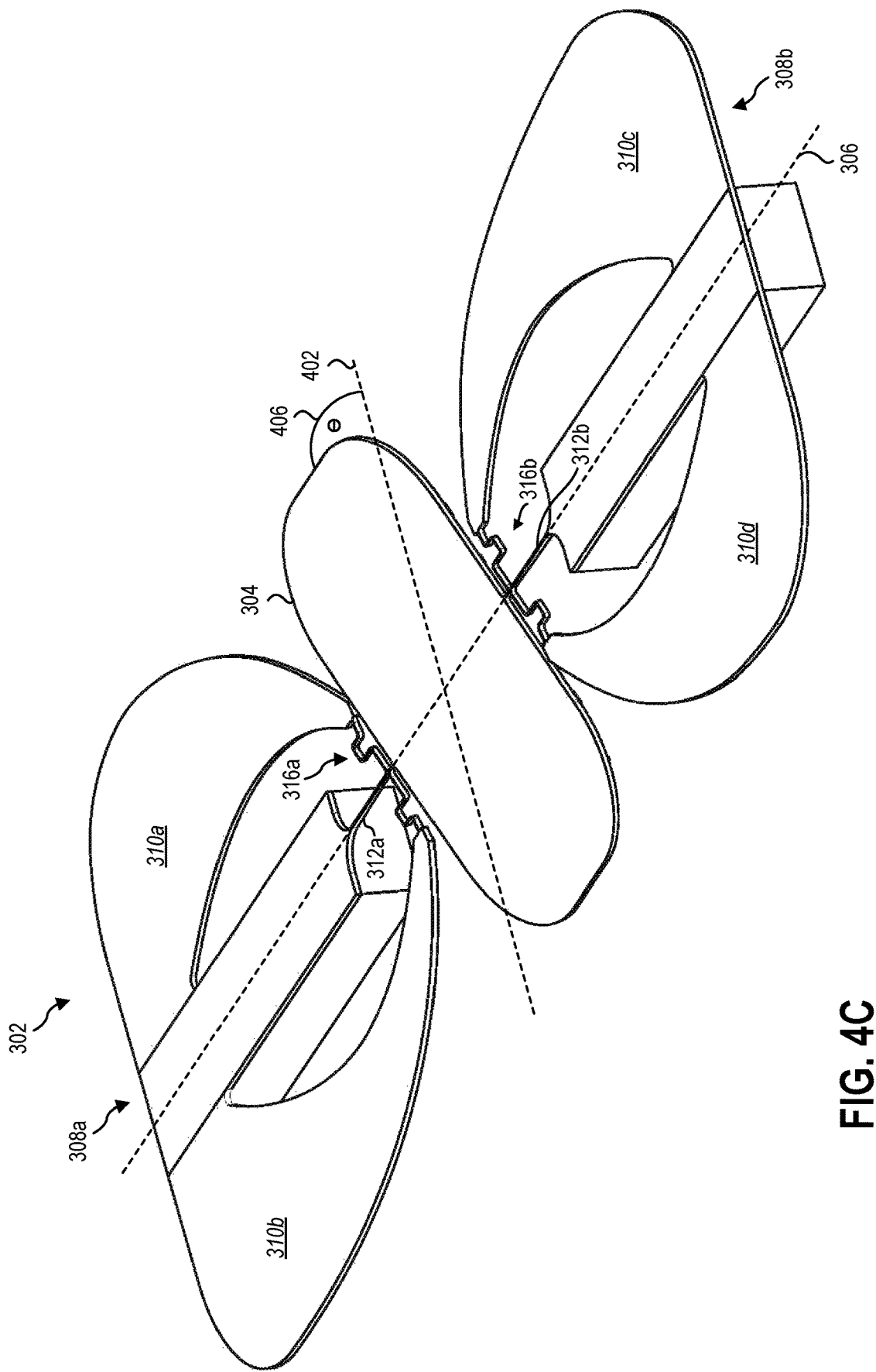

FIGS. 4A-4C illustrate an example implementation of the actuator assembly 302 in accordance with one or more embodiments described herein. In particular, FIG. 4A illustrate an example path of movement of the mirror device 304 based on torsional forces applied to the torsional beams 312a-b as a result of the actuators 310a-d being activated and transferring torsional forces to the torsional beams 312a-b via the lever devices 316a-b.

For instance, FIG. 4A illustrates the mirror device 304 at a resting or initial position in which the mirror device 304 has not been displaced relative to a plane defined by the longitudinal axis 306 and lateral axis 402. In one or more embodiments, this orientation of the mirror device 304 may occur between positive and negative displacements of the mirror device 304, as shown in FIGS. 4B and 4C.

As shown in FIG. 4B, as a result of a voltage or other electrical charge (e.g., alternating voltage signals) being applied to one or more actuators 310a-d, one or more of the actuators (e.g., the first actuator 310a and the third actuator 310c) may be activated and move in a torsional direction about the longitudinal axis 306. As a result, a torsional force is applied to the torsional beams 312a-b by way of the lever devices 316a-b (e.g., two-stage lever devices 316a-b) causing the mirror device 304 to rotate about the longitudinal axis 306. As shown in FIG. 4B, the mirror device 304 may be rotationally displaced relative to a plane of a lateral axis 402 to a maximum displacement angle (ϕ) 404. As a result of the lever devices 316a-b and torsional beams 312a-b, the displacement angle 404 may be considerably larger than an angle of displacement of the actuators 310a-d. In this way, the actuator assembly 302 may convert a small angle of displacement of the actuators 310-d to a significantly larger angle of displacement of the mirror device 404 while maintaining a high degree of control and precision in the rotation of the mirror device 404.

As shown in FIG. 4C, as a result of a voltage or other electrical charge being applied to one or more actuators 310a-d, one or more actuators (e.g., the second actuator 310b and the fourth actuator 310d) may be activated and move in a torsional direction about the longitudinal axis 306. As a result, a torsional force is applied to the torsional beams 312a-b by way of the lever devices 316a-b causing the mirror device 304 to rotate about the longitudinal axis 306 in an opposite direction than the example shown in FIG. 4B. As shown in FIG. 4C, the mirror device 304 may be rotationally displaced relative to the plane of the lateral axis 402 to a maximum displacement angle (θ) 406. The displacement angles 404-406 may refer to the same magnitude of displacement relative to the plane of the lateral axis 402. Alternatively, the displacement angles 404-406 may refer to different angles (e.g., different maximum displacement angles depending on an application of the actuator assembly or sensor device).

Figure 5A:
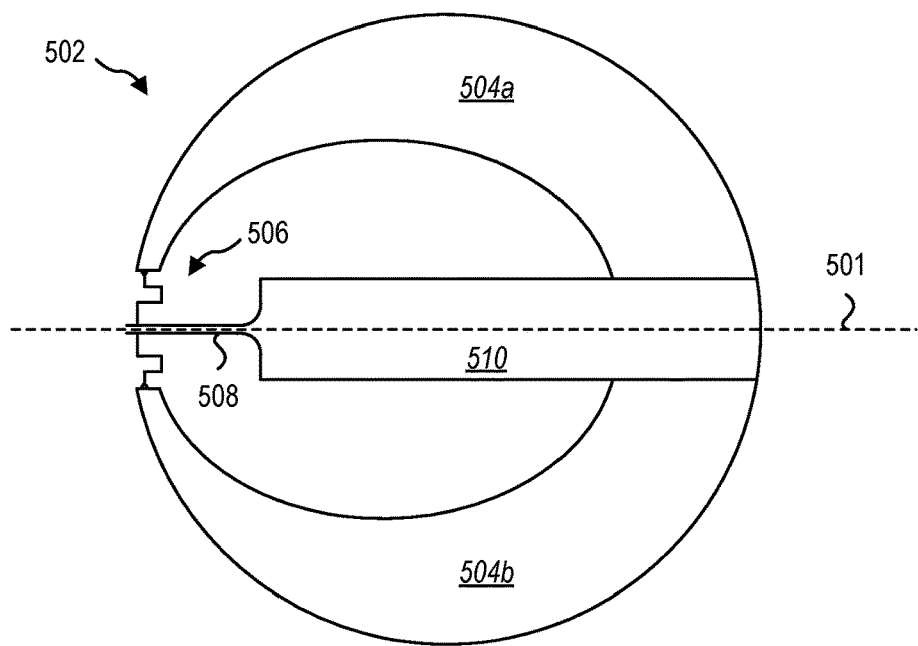
FIGS. 5A-5B illustrate example actuator assemblies having different shaped actuator wings in accordance with one or more embodiments.
Figure 5B:
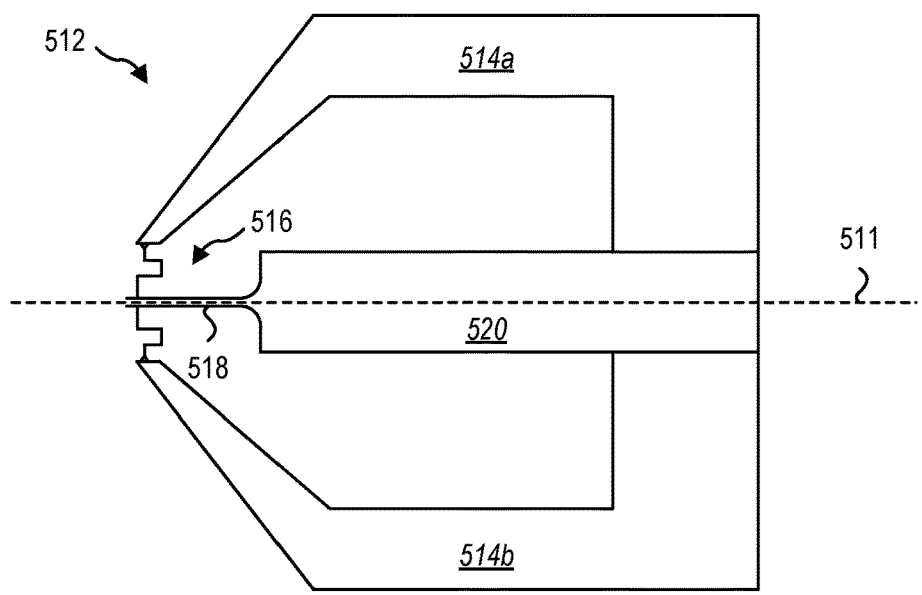

FIGS. 5A-5B illustrate example embodiments of actuator wings having alternative shapes in accordance with one or more embodiments described above. For example, FIGS. 3A-4C illustrate examples in which the actuator wings 308a-b include actuators 310a-d having curved shapes. As discussed above, the curved shapes of the actuators 310a-d enable a center of mass of the actuators 310a-d to have a center of mass away from the longitudinal axis 306 and relative to structural portions of the actuators 310a-d connected to the anchor devices 314a-b and torsional beams 312a-b such that when the actuators 310a-d are activated (e.g., when a voltage is applied to the actuators 310a-d), the displacement of the actuators 310a-d apply a torsional force around the longitudinal axis 306 rather than a vertical, horizontal, or inefficient pumping force.

In accordance with one or more embodiments in which actuators apply torsional forces about a longitudinal axis, FIGS. 5A-5B illustrate example actuator wings having alternative shapes than one or more embodiments described above. While FIGS. 5A-5B illustrate different shaped actuators, it will be understood that other components of the actuator assemblies and MEMS devices may similarly apply to the embodiments described in FIGS. 5A-5B.

FIG. 5A illustrates an example actuator wing 502 including actuators 504a-b coupled to a torsional beam 508 via a two-stage lever device 506. The actuator wing 502 may further include an anchor 510 to provide a fixed structure relative to displacement of a mirror device and actuators 504a-b about a longitudinal axis 501. As shown in FIG. 5A, the actuators 504a-b may form a circular shape including symmetrically shaped actuators 504a-b about the longitudinal axis 501.

FIG. 5B illustrates another example actuator wing 512 including actuators 514a-b coupled to a torsional beam 518 via a two-stage lever device 516. The actuator wing 512 may further include an anchor 520 to provide a fixed structure relative to displacement of a mirror device and actuators 514a-b about a longitudinal axis 511. As shown in FIG. 5B, the actuators 514a-b may have a polygonal shape or polygonal properties that define symmetrically shaped actuators 514a-b about the longitudinal axis 511. FIGS. 5A-5B are shown by way of example only. As mentioned above, one or more actuators described herein may alternatively have circular, parabolic, arcuate, curved, polygonal shapes, or any other shape that facilitates a torsional force to be applied about a longitudinal axis when the actuators are activated.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A non-resonant microelectromechanical systems (MEMS) scanning device, comprising:
    a mirror device;
    a torsional beam structure comprising a first torsional beam extending outward from a first longitudinal side of the mirror device and a second torsional beam extending outward from a second longitudinal side of the mirror device, wherein a torsional force applied to the torsional beam structure causes the mirror device to rotate about a longitudinal axis; and
    a first actuator wing including a first pair of actuators positioned on the first longitudinal side of the mirror device coupled to the first tortional beam and a second actuator wing including a second pair of actuators positioned on the second longitudinal side of the mirror device and coupled to the second torsional beam, wherein each actuator wing from the first actuator wing and the second actuator wing wings comprises:
        a first actuator positioned on a first side of the torsional beam structure and coupled to the torsional beam structure via a lever device, the first actuator having a shape that, when the first actuator is activated, causes a torsional force to be applied to the first actuator about the longitudinal axis that transfers to the torsional beam structure via the lever device; and
        a second actuator positioned on a second side of the torsional beam structure and coupled to the torsional beam structure via the lever device, the second actuator having a similar shape as the first actuator.

2. The non-resonant MEMS scanning device of claim 1, wherein the first actuator comprises a first piezoelectric actuator and the second actuator comprises a second piezoelectric actuator.

3. The non-resonant MEMS scanning device of claim 2, wherein each piezoelectric actuator from the first piezoelectric actuator and the second piezoelectric actuator comprises a silicon substrate having a thin film piezoelectric material deposited thereon.

4. The non-resonant MEMS scanning device of claim 1, wherein the shape of the first actuator comprises one or more of a circular shape, parabolic shape, arcuate shape, curved shape, or a polygonal shape that, when the first actuator is activated, causes the torsional force to be applied to the first actuator about the longitudinal axis.

5. The non-resonant MEMS scanning device of claim 1, wherein each actuator wing from the first actuator wing and the second actuator wing further comprises an anchor structure positioned between the first actuator and the second actuator and coupled to the mirror device via the torsional beam structure.

6. The non-resonant MEMS scanning device of claim 5, further comprising a sensing element on at least one anchor structure of the first actuator wing and the second actuator wing, the sensing element being configured to detect a measure of rotation of the mirror device based on torsional force applied to the torsional beam structure.

7. The non-resonant MEMS scanning device of claim 6, wherein the sensing element comprises a piezoelectric material configured to detect the measure of rotation based on a detected electric potential generated from the torsional force applied to the torsional beam structure.

8. The non-resonant MEMS scanning device of claim 6, wherein the sensing element comprises a piezoresistive material configured to detect the measure of rotation based on a detected change in electrical resistivity from the torsional force applied to the torsional beam structure.

9. The non-resonant MEMS scanning device of claim 1, wherein the lever device comprises:
    a first portion of the lever device for coupling the first actuator to the torsional beam; and
    a second portion of the lever device for coupling the second actuator to the torsional beam, wherein the second portion of the lever device has a symmetrical shape to the first portion of the lever device about the longitudinal axis.

10. The non-resonant MEMS scanning device of claim 9, wherein each portion of the lever device from the first portion and the second portion comprises:
    a stiff stage that provides structural support for translating the torsional force from a corresponding actuator to the torsional beam structure; and
    a compliance stage that flexes in response to torsional force applied to the torsional beam structure from the first actuator or the second actuator.

11. The non-resonant MEMS scanning device of claim 1, wherein the mirror device is configured to rotate about the longitudinal axis by rotating back and forth between maximum rotational displacement angles.

12. The non-resonant MEMS scanning device of claim 11, wherein the maximum rotational displacement angles exceed a rotational displacement of the first actuator when activated.

13. The non-resonant MEMS scanning device of claim 1, each actuator wing of the pair of actuator wings is configured to be activated by applying an alternating voltage signal to the first actuator and the second actuator.

14. An actuator wing assembly of a non-resonant microelectromechanical systems (MEMS) device, comprising:
a torsional beam extending outward from a side of a mirror device, wherein torsional force applied to the torsional beam causes the mirror device to rotate about a longitudinal axis;
a first actuator positioned on a first side of the torsional beam and coupled to the torsional beam via a first portion of a two-stage lever device, the first portion of the two-stage lever device comprising a stiff stage having a first one or more structural members and a compliance stage having a second one or more structural members, the second one or more structural members of the compliance stage having more flexibility than the first one or more structural members of the stiff stage; and
a second actuator positioned on a second side of the torsional beam structure and coupled to the torsional beam structure via a second portion of the two stage lever device, the second portion of the two-stage lever device having a symmetrical shape as the first portion of the two-stage lever device about the torsional axis.

15. The actuator wing assembly of claim 14,
wherein the stiff stage provides structural support for translating the torsional force from the first actuator to the torsional beam structure; and
wherein the compliance stage flexes in response to torsional force applied to the torsional beam from the first actuator or the second actuator.

16. The actuator wing assembly of claim 14,
wherein the first portion of the lever device comprises a zig-zag structure of support members positioned between the first actuator and the torsional beam; and
wherein the second portion of the lever device comprises a symmetrical zig-zag structure of support members positioned between the second actuator and the torsional beam.

17. The actuator wing assembly of claim 14, wherein the shape of the first actuator comprises one or more of a circular shape, parabolic shape, arcuate shape, curved shape, or a polygonal shape.

18. The actuator wing assembly of claim 14, further comprising an anchor structure positioned between the first actuator and the second actuator and coupled to the mirror device via the torsional beam structure, wherein the anchor structure comprises a sensor element configured to detect a measure of rotation of the mirror device based on torsional force applied to the torsional beam.

19. The actuator wing assembly of claim 18,
wherein the first actuator comprises a first piezoelectric actuator and the second actuator comprises a second piezoelectric actuator; and
wherein the sensing element comprises a piezoelectric material or a piezoresistive material configured to detect the torsional force applied to the torsional beam.

20. The actuator wing assembly of claim 14, wherein the first actuator comprises a first piezoelectric actuator and the second actuator comprises a second piezoelectric actuator.

* * * * *